Nov. 13, 1928.

1,691,611

J. REECE ET AL

POWER TRANSMISSION

Filed Sept. 30, 1924 3 Sheets-Sheet 1

Fig. 1.

Inventors.
John Reece
Franklin A. Reece by Rogers, Kennedy & Campbell
Attys

Nov. 13, 1928.  
J. REECE ET AL  
POWER TRANSMISSION  
Filed Sept. 30, 1924   3 Sheets-Sheet 2  
1,691,611

Fig. 2.

Inventors.  
John Reece  
Franklin A. Reece  
by Rogers, Kennedy & Campbell,  
Attys.

Patented Nov. 13, 1928.

1,691,611

UNITED STATES PATENT OFFICE.

JOHN REECE, OF BOSTON, AND FRANKLIN A. REECE, OF BROOKLINE, MASSACHUSETTS, ASSIGNORS TO REECE TRANSMISSION COMPANY, OF BOSTON, MASSACHUSETTS, A CORPORATION OF MAINE.

POWER TRANSMISSION.

Application filed September 30, 1924. Serial No. 740,753.

This invention relates to power transmission, and involves a novel method and apparatus adapted for the transmission of power for various purposes and in various situations, especially where the load is variable, or where the speed ratio is required to be altered, for example, in the case of motor vehicles.

The general object of this invention is to enable alteration of the speed ratio between the driving member or shaft and the driven member or shaft, and of the torque delivered to the latter, by gradual or continuous changes, as distinguished from step by step adjustment, and to bring about such readjustment of ratio and torque in a self acting manner determined by the existing conditions or the load on the driven shaft. Thus in the case of a motor vehicle when an increase of grade is encountered, the speed ratio and torque, with this invention, accommodate themselves to give the most effective drive, that is the maximum driven speed consistent with the existing conditions; the driven shaft and the vehicle slowing down upon such an increase of load to an extent such that the torque delivered will propel the vehicle at the maximum speed consistent with the energy delivered by the motor and the conditions to be overcome. When the engine torque is equivalent to the driven shaft load the speed ratio will be one to one, and the mechanism will rotate as a unit without internal motion or wear; while with conditions of high load the ratio may decease toward or substantially to zero, until the torque is able to effect the desired drive. Control by the engine throttle is additional or supplemental to the self control of this invention, and the operator can, of course, at will, increase or decrease the developed power and thus speed up or slow down the driving and driven parts as he may desire.

Transmission mechanisms of the nature referred to have been disclosed in copending applications, and the present invention is in one aspect an improvement thereon, although the principles hereof may in part be embodied in other and different forms of transmission. A specific object of the present invention is to fortify or supplement the driving action at the lower ratios so as to enable a very high torque to be developed, and in a wholly self acting manner, and without the need of manual gear changing devices. Other and further objects and advantages of the present invention will be elucidated in the hereinafter following description of one instance or embodiment thereof, or will be apparent to those skilled in the subject matter. To the attainment of such objects and advantages the present invention consists in the novel method and apparatus for power transmission, and the novel features of combination, arrangement, structure and detail herein described or illustrated.

In the accompanying drawings

The mechanical elements will first be described and subsequently the method of transmission and mode of operation involved.

It will be convenient first to describe the driving parts, including the engine shaft and elements turning with it, then the driven shaft and elements turning with it, then the stationary parts including the housing, and finally the various intermediate parts and transmitting means.

The driving shaft 13 may be that of an internal combustion engine, and it is shown as carrying a circular disk or rotary support 14 which may be considered as part of a fly wheel, since a fly wheel effect is attained by this element and the parts carried by it. These parts include a cylindrical rim 15 and a circular cover plate 16, enclosing the hollow interior of the fly wheel or transmission. Other driving parts comprise the studs 17 for the main transmission devices or carriers, and the studs 19 for the supplemental devices or carriers, the studs 17 and 19 each extending from the disk 14 to the cover plate 16. The disk 14 also supports studs 21, forming bearings for pinions cooperating with the main devices, while the cover plate 16 carries similar studs 22 for the supplemental devices.

Figure 1:
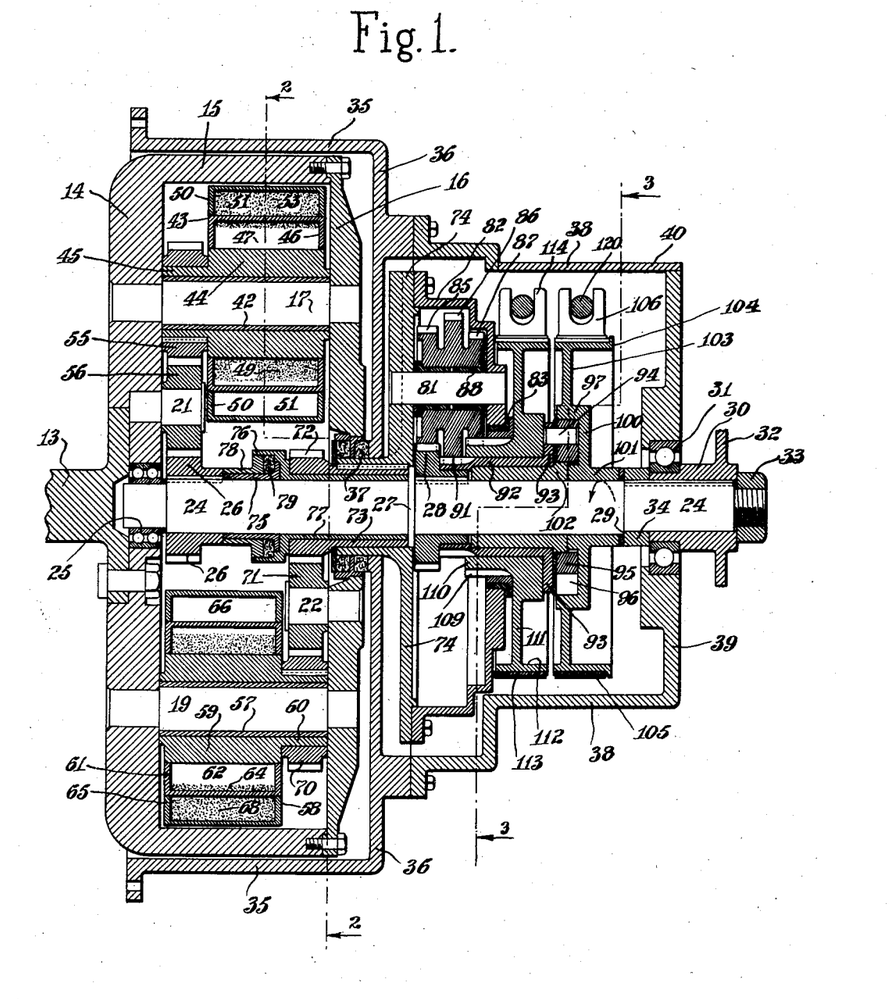
Fig. 1 is substantially a central longitudinal section view of one form or embodiment of a transmission apparatus utilizing the principles of the present invention, but taken along two radii, as indicated by the section line 1—1 in Fig. 2, so that the upper half is a combined elevation and section and the lower half is a combined plan view and section.

The driven parts comprise the driven shaft 24 with which turn the following parts, beginning at the left end in Fig. 1. A bearing 25 is interposed between the driven shaft and the fly wheel disk 14. A central pinion 26 is keyed to the driven shaft. To the right of it are certain parts turning loosely, to be later described. The shaft is formed with a collar 27 affording positioning shoulders. Then is shown a second central gear 28 keyed to the shaft. Then more loose parts. The right hand end of the driven shaft has a collar or hub 30 keyed to it, and this carries a ball bearing 31, and a flange or enlargement 32, which may be part of a universal joint or other connection to the vehicle wheels. A nut 33 at the end of the shaft 24 secures the described parts in position.

The stationary elements shown in the drawings hereof comprise a cylindrical housing 35 having at its rear face a circular wall 36, the central portion of which is open to accommodate the rotary parts, with oil excluding packings 37 between. To the rear of the housing is a smaller fixed housing 38 and this at the rear has an upright closing wall 39, cut away axially for the shaft, and giving support to the bearing 31. The rear housing is open above, but provided with a removable cover plate 40.

The remainder of the description will deal first with the main transmission devices, shown specifically in the form of planetating carriers, as in said copending applications and then the supplemental transmission devices, also shown as plenetating carriers, and finally a device for effecting the reversal of the direction of drive at will through pedal or manual control. Pursuant to the present invention the main transmission device, or devices, as there may be more than one, are in operating effect at the higher ratios, operating up to full speed or unit ratio, while at lower ratios the supplemental transmission devices are operative to enhance the delivered torque or supplement the action of the main devices. When the load is small and the driven speed high the main devices will be sufficient, but with heavy loads and low ratio it may be that the torque will sometimes be insufficient without some auxiliary expedient or means. A speed reducing gear, connected at will, would give the desired power but this would be objectionable for obvious reasons, and non-automatic. With the present invention the required increase of torque is automatically effected by the coming into operation of the supplemental transmission means or devices, which may be inoperative or ineffective at the higher ratios, but become operative at a predetermined ratio as the load slows down the driven shaft. The principle thus set forth is believed to be new, and obviously the throwing in of supplemental transmission devices could be progressive, the main devices alone acting at the higher ratios, the second or supplemental devices at certain lower ratios, and still further devices at yet lower ratios. The advantage of more effective drive where high torque is required is thus secured without impairing the automatic character of the mechanism.

The main transmission means may consist of one or more devices or transmitting connections between the driving and driven shafts, two being shown. These are actuable devices, caused to travel around an orbit by the power of the driving shaft, and actuated by connections from the driven shaft at a rate depending at any time on the difference in speeds of the shafts, the actuation ceasing with a ratio of one to one; and each device or carrier cooperates with a centrifugal mass or masses, energized with centrifugal force by the rotation of the driving shaft, and cooperating with the devices or carriers to deliver the requisite torque to the driven shaft. For purposes of illustration planetating carriers 43 are employed, these being the uppermost and lowermost of the carriers as seen in Fig. 2, the remaining carriers 58 being the supplemental ones already referred to.

The main planetating carriers 43 may be constructed in various ways, but herein each of them is shown of a simple and effective structure as follows. Each of the studs 17, extending across the interior of the fly wheel, is shown surrounded by a friction sleeve 42 which in turn is surrounded by the carrier 43. The carrier may comprise a hub portion 44 turning loosely on the sleeve, the same having an outward extension 45 to the left. In the illustrated embodiment annular channels are shown, within which centrifugal masses play. This result may be afforded by a hollow, annular metal piece or channel member 46 directly surrounding and facing the hub, so as to enclose an annular channel 47. The channel at one part may be closed or interrupted by a radial vane or abutment 48, constituting a pusher or pocket for the centrifugal mass or masses 49, which is preferably of a fluent nature such as white lead in oil, with some mercury added, or other flowing mass of heavy specific gravity, for example mercury. Instead of a single annular channel it is preferred to have a plurality of them, for example two; and these may be variously arranged, for example concentrically as shown. Thus an outer channel piece 50 is indicated surrounding and facing the inner channel piece 46, and forming an outer channel 51 containing abutment 52 and flowing mass 53. The described parts, the hub and the two channel pieces, may be formed separately and assembled and welded together, forming a liquid tight structure, so that the device with the centrifugal liquid is self contained and free from leakage. The several interior channels may be supplied with centrifugal liquid through holes 54, indicated in Fig. 2, the same to be tightly closed with plugs. The air within the channels may be previously removed, or replaced by a different gas.

The planetating operation of the main carriers 43 may be effected by connections from the driven shaft such that the speed of planetation will vary in accordance with the speed difference between the driving and driven members. A simple manner of connection for this purpose consists of a planet gear 55 keyed on the hub extension 45 of the carrier, the same engaging an idler pinion 56 loose on the stud 21, and this in turn meshing with the central gear 26, keyed to the driven shaft. When unit ratio is in effect there will be no rotation of these gears and pinions, but when the driven shaft is turning more slowly than the driving shaft the described connections cause planetary rotation of the carriers, and this, due to the idler pinion 56, is in a direction the opposite to the general rotation of the fly wheel, which gives a better transmitting effect. As seen in Fig. 2 the fly wheel turns counterclockwise, while the several carriers turn clockwise.

Figure 2:
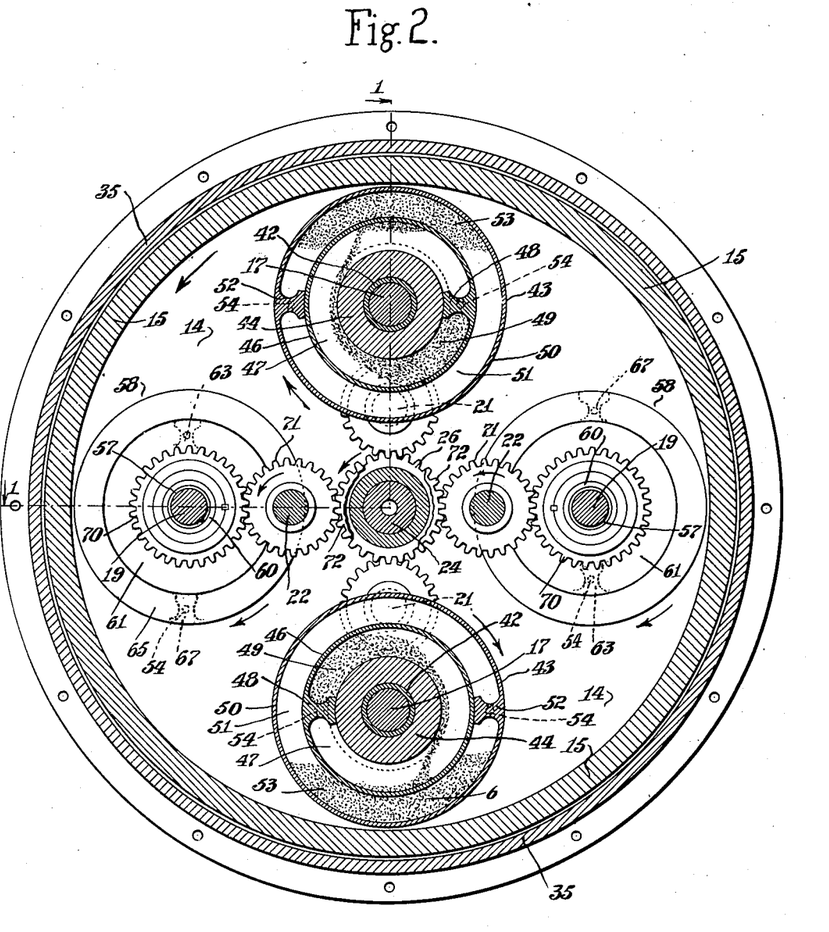
Fig. 2 is a transverse section taken substantially along the broken line 2—2 of Fig. 1.

The quantity of liquid mass within each channel may be varied, but may be for example as indicated in Fig. 2. It will be understood that at the usual high speeds of rotation the liquid tends always to maintain an outward position, and that as each abutment moves outwardly, during the planetating action, it picks up or thrusts the liquid mass ahead of it in the channel, thus carrying and compelling the mass bodily from an outward to an inward position in opposition to the high centrifugal force existing in the mass, so that the centrifugal force is received by and applied to the abutment in a manner to retard the planetation of the carrier, and thereby to transmit power to the driven shaft through the gear connections described. After each abutment passes its most outward point and moves inwardly the liquid mass in front of it will be progressively discharged or released, at an inward point, and thus allowed to return by centrifugal force to its outermost position, awaiting the next planetating advance of the abutment. Each abutment will thus cooperate with the corresponding mass for something more than a half rotation. There being two channels and two abutments, shown spaced diametrically opposite, it follows that there will be continuous transmission, since the two actions will overlap.

Referring now to the supplemental carriers 58 these may be more than two in number, but the principle is adequately illustrated by showing two, arranged to act in unison to supplement the delivered torque when the ratio is low. In the drawing the parts are shown in the condition that they would present assuming a quite low speed ratio and high delivered torque, so that not only the main carriers, but the supplemental carriers are in effective action. Like the main carriers the supplemental carriers are preferably arranged in diametrical opposition for the sake of balance; and each supplemental carrier may be substantially identical in construction with the main carriers. The various carriers, being preferably rotary or planetating devices may, in a specific sense, be termed rotors, indicating planetating devices capable of cooperating with centrifugal masses in accordance with the principles stated.

Each of the supplemental carriers or rotors 58 is shown as surrounding a friction sleeve 57, the carrier comprising a hub 59 turning loosely on the sleeve, similarly to the hub 44 of each of the main carriers. Similarly, the hub 59 has an extension 60, and is surrounded by an inner channel piece 61 forming an inner channel 62 within which are disposed an abutment 63 cooperating with fluent or other centrifugal mass 64. An outer channel piece 65 affords an outer channel 66 concentric with the channel 62 and containing an abutment 67 cooperating with centrifugal material 68. The actuation or planetary rotation of each carrier 58 may be effected through a planet gear 70 keyed upon the hub extension 60, this gear engaging an idler pinion 71 loose on the stud 22 and this in turn engaging a central gear 72, through which the planetating action is effected. This central gear, however, is not fast on the driven shaft, as in the case of gear 26, but is secured or mounted upon a sleeve 73 which is loose on the driven shaft and extends to the right to a point exterior to the rotating fly wheel structure. The sleeve 73 has keyed to its exterior end a rotary support or disk 74 arranged to carry certain gearing as will be described. The sleeve is held in its axial position by spacing sleeve 75 and by the flange 76 of a friction sleeve 77 interposed between the sleeve 73 and the driven shaft. The elements 75 and 76 cooperate with a flanged sleeve 78 to enclose packing material 79 arranged to prevent escape of oil from the interior of the mechanism.

While the central gear 72 is in the nature of a connecting element between the supplemental rotors and the driven shaft, this gear, as stated, is not directly connected with the driven shaft, but only indirectly connected through the further gearing and elements to be described, including reduction gearing, which has the effect of increasing the delivered power, and including also a one-way device, in the nature of a pawl and ratchet, by which the connections automatically become inoperative at high ratios, although operative at low ratios. These various connections are accommodated within the smaller or rear housing 38.

The complete connections through which the supplemental carriers 58 are planetated include the described planet gear 70 thereon, the idler pinions 71, and the central gear 72 on the sleeve 73 having the disk or rotary gear support 74 at its outer end, and the following further connections. The rotary support 74 is shown provided with one or more rearwardly extending studs 81, three being shown, the rear ends of which may be supported by a bridge or housing 82 permanently attached to the disk 74. A friction ring 83 is interposed between the inner part of the housing 82 and the parts rotating within the same.

Figure 3:
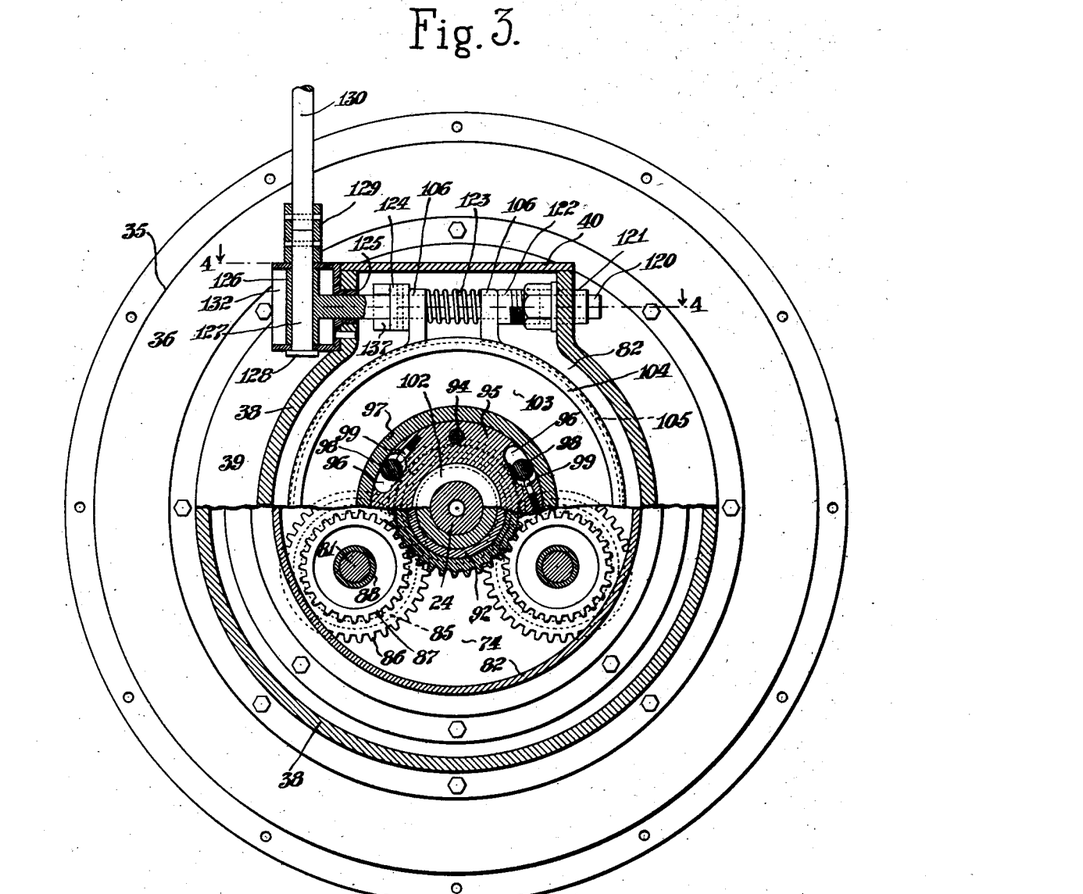
Fig. 3 is a transverse section taken along the broken line 3—3 of Fig. 1.

Interconnected gears 85 and 86 are arranged to turn loosely on each of the studs 81. A third gear 87 is also connected to these gears for purposes of reverse drive as will be later described. Friction sleeves 88 are interposed between the studs 81 and the triple gears 85—86—87. The three gears are of different sizes and while the relations may be varied preferably the first gear 85 is smaller than the second or middle gear 86 and larger than the third or rearmost gear 87. The connection to the driven shaft is shown by the direct intermeshing of the gear 85 with the central gear 28, already mentioned, keyed to the driven shaft. This of course would not constitute an operative connection without some control, as the gear 85 would be free to planetate on its stud or bearing. The second or middle gear 86 however is shown as meshing with a central gear 91 formed or secured on a sleeve 92 which is normally held effectively stationary during low ratio forward drive in any desired manner, for example as follows. The sleeve 92 has an annular flange 93 carrying a series of studs 94 upon which is mounted a ring 95. This ring is composed of hardened steel and is formed with tapered recesses 96 which open outwardly toward a surrounding steel ring 97, normally held stationary during forward drive. Within each recess 96 is a sphere or roller 98 of a size adapted to be wedged against the outer ring by spring pin 99. Viewing Fig. 3, obviously when the ring 95 tends to turn counterclockwise it may do so freely; whereas upon any tendency to turn it clockwise the one-way device prevents this, the rollers 98 becoming tightly wedged between the rings 95 and 97. The outer ring 97 may be arranged and mounted as follows. This ring is shown as a flange extending forwardly from a disk 100 having a hub 101, loosely surrounding the driven shaft, and properly spaced thereon by a sleeve 102 forward of it, inside of the sleeve 92, and to the rear a sleeve 34, held against the shoulder 29 of the driven shaft by the parts to the rear already described. The elements 97, 100 and 101 are shown as an integral piece loosely rotatable on the driven shaft but adapted normally to be held stationary for example by a web 103 carrying a rim or pulley 104 engaged by a brake or friction band or strap 105, which may be tightened upon the rim to hold the parts stationary, the two ends of the strap having upstanding forked lugs 106 adapted to be engaged by the strap tightening devices to be described.

The operation of the mechanism under forward drive, that is with the brake band 105 locking the rim 104 and connected parts, may now be described. The drawings may be considered as showing the power of the engine shaft 13 transmitted at low ratio, with high torque delivered to the driven shaft 24. As seen in Fig. 2 the driving members are rotating bodily in counterclockwise direction at the speed of the engine. The driven shaft and connected parts are supposed to be rotating in the same counterclockwise direction, but at a low speed or even held against rotation by an excessive load. In either of these cases all of the planetating carriers or rotors will be in rotation in clockwise direction, as indicated in Fig. 2, and will be operating continuously to force centrifugal mass portions inwardly in opposition to the centrifugal force thereof, as described. The main carriers 43 are planetated through the gears 55, 56 and 26, at a rate in direct proportion to the difference in speeds of the two shafts, so that the speed of planetation will be quite high when the driven shaft is turning very slowly. The centrifugal force in the mass portions, pressing outwardly against the abutments, operates as a live retarding pressure, which will be of high magnitude at high engine shaft speeds, and will deliver high torque at the higher speeds of planetation corresponding with the lower speeds of the driven shaft. Such live centrifugal pressure is thus applied through the carriers and transmitted through the gears to deliver effective torque to the driven shaft. The main carriers or rotors 43 will be in active operation under all conditions excepting at unity ratio, when the driven shaft is turning with the same speed as the driving shaft.

The supplemental carriers 58 are operated in some respects analogously to the main carriers, with differences due to the different actuating connections. Indeed the supplemental carriers, as will be seen, are not always in operative connection with the driven shaft, and when they are so connected they are actuated only through the differential or reduction gearing 28, 85, 86, 91.

Assuming first a driven shaft which is held stationary or at zero speed, the operation of the supplemental carriers may be described as follows. The centrifugal masses act strongly to resist the planetation of the carriers. This resistance creates a tendency to rotate the central gear 72 and the supporting disk 74 connected thereto. The direction of this tendency is counterclockwise, the same as the driving parts. The gear 85, mounted on the support 74, tends to travel counterclockwise around the central gear 28, which is keyed on the driven shaft, and therefore assumed to be held stationary. The transmitted pressure therefore tends to rotate the gear 85 in a counterclockwise direction, and with it the gear 86, the two being attached together. The gear 86 is larger than the gear 85 and meshes with the central gear 91 which is smaller than the gear 28. The action described therefore tends to turn the gear 91 in a clockwise direction. It can not so turn because it is connected to the pawl and ratchet ring 95 which, as explained in connection with Fig. 3, can never turn clockwise relatively to the outer ring 96, assumed to be held stationary by the brake band 105. This action of the pawl and ratchet devices is vital to the operation of the supplemental carriers, since without it the gears 85 and 86 would turn loosely and the carriers 58 would not planetate at all. Under the existing assumptions therefore the gears 28 and 91 are both held from movement, which in effect anchors the supporting disk 74 and holds the central gear 72 stationary, compelling the carriers 58 to planetate with the same full speed as the main carriers, so as to deliver and add their torque to that delivered by the main carriers. Moreover as the gears 28, 85, 86, 91 are reduction gears an increased torque will be delivered, more than doubling the power transmitted by the main carriers.

When the load is such that the driven shaft may turn, but only at a slow rate, with low ratio, the conditions will be substantially the same as just described, with the following exceptions. The slow counterclockwise rotation of the driven shaft, with its attached central gear 28, permits actual rotation of the gears 85 and 86, and the proportions are such that the rotary support 74 and central gear 72 will be allowed to turn with a speed substantially faster than the slow speed of the driven shaft. This will mean a decrease in the planetating action of the supplemental carriers. This decrease moreover will be at a greater rate than the decrease of planetation of the main carriers. As the driven shaft gradually increases speed from zero the central gear 72 will be permitted to increase its speed, always proportionately greater than that of the driven shaft. The delivered torque from the supplemental carriers therefore gradually diminishes. There will be a critical speed of the driven shaft, depending on the exact dimensions of the various gears, for example when it is turning at about half the speed of the driving shaft, under which conditions the gear support 74 and the central gear 72 will be allowed to turn at the full speed of the driving parts. At this point the planetation of the supplemental carriers ceases. The drive is maintained by the main carriers only, the load being relatively light. Thus one of the stated requirements is complied with, namely that as the load increases, and the driven shaft slows down, the supplemental transmitting devices come automatically into action; and their effective action increases progressively as the increase of load compels further slowing down of the driven shaft.

It yet remains to describe the action when the driven shaft speed is higher than the critical speed referred to. As the driven shaft speed approached that of the driving shaft, up to the critical point, the planetating speed of the supplemental carriers decrease to zero. A further increase of the relative speed of the driven shaft, beyond the critical point, would obviously tend, through the reduction gearing described, to reverse the direction of planetation of the supplemental carriers. Under such circumstances the centrifugal force in the masses therein would tend to give drive in the wrong direction, reducing the effective transmission, and preventing normal full speed drive with the main carriers in the manner described. However, this action is prevented from taking place by the pawl and ratchet or one-way device comprising the elements 95, 97, 98. The ring 95 is held by the pawls only against clockwise rotation, and with the assumed reverse action the ring would no longer be held, but would be free to turn without resistance in a counterclockwise direction. Due to this the supplemental carriers will never be planetated in the wrong direction. At the lower ratios they will be planetated clockwise to add effectiveness to the drive. At higher ratios they will be inoperative and the main carriers will supply the entire transmission, without cooperation or hindrance from the supplemental carriers. It will be understood that the described action is dependent upon the brake strap 105 being tightened upon the rim 104. If this strap be loosened the ring 95 is rendered free to turn loosely in either direction and the supplemental carriers will not planetate.

This structure and operation meets the specific objects as already stated. The main carriers 43, 43 are operative to transmit power at speeds varying from unit ratio downwardly, and they take care of the ordinary requirements of a motor vehicle; but when the speed ratio drops below a predetermined point, due to excessive loads, such as a steep upgrade, the slowing of the driven shaft brings into operative effect the train of mechanism which actuates the supplemental carriers.

The pawl and ratchet becomes effective and the two supplemental carriers are planetated, thus adding their transmitting effect to that of the main carriers, in a degree increasing rapidly as the speed ratio approaches zero. The coming into action of the supplemental carriers is seen to be wholly automatic and it supplies a need existing under conditions of heavy load. With a quite low ratio, due to a heavy load, the supplemental carriers will more than double the driving effect due to the main carriers and the increase may be greater with proper changes in proportions. The multiplied torque in the supplemental system is due in part to the fact that the reduction gearing gives increased leverage; and if desired the supplemental carriers 58 may be provided with a greater quantity of centrifugal mass or flowing material than the main carriers, thus further increasing their effectiveness.

To reverse the direction of drive the following simple and convenient means may be employed. This may be done on the principle of utilizing the supplemental carriers to deliver high torque in a reverse direction to the driven shaft, sufficient to more than overcome the forward driving effect of the main carriers, so that the latter need not be thrown out of operation. It will be understood that the brake band 105 should be loosened so as to render free the central gear 92 and other parts controlled thereby. This renders the gear 86 inoperative, this being the middle one of the three gears 85, 86 and 87. For effecting reverse drive the gear 87 may be utilized. This, it will be noted, is of smaller, instead of larger, diameter than the gear 85 which engages the central gear 28, keyed to the driven shaft. The gear 87 is shown engaging a central gear 109 formed or secured upon a sleeve 110 loosely surrounding the sleeve 92 which carries the gear 91. The sleeve 110 extends to the right and has an annular web 111 supporting a rim or pulley 112. This rim is engaged by a brake strap 113 having upwardly extending lugs 114 by which the brake may be applied so as to render stationary the elements 109 to 112, which otherwise turn loosely.

The operation of such reverse mechanism may be as follows. The brake strap 105 is supposed to be loosened and the strap 113 tightened. This renders stationary the central gear 109. The effective reduction gearing therefore consists in the gear 28 on the driven shaft engaged by gear 85, and the gear 87 attached to the gear 85 but smaller than it and engaging the central gear 109, larger than the gear 28. The centrifugal force in the masses of the supplemental carriers 58, considered as a thrust resisting the planetation thereof, tends to turn the gear supporting disk 74 in a counterclockwise direction, the same as the fly wheel. The stud 81 on this disk carries the combined gears 85, 87. The gear 87 thus travels counterclockwise around the fixed central gear 109, and the planetary rotation of the gear 87, and therefore the gear 85, is counterclockwise. The gear 85 therefore transmits to the central gear 28 and turns the latter, and therefore the driven shaft, in clockwise direction, as desired. The powerful torque thus delivered to the driven shaft in a reverse direction more than overcomes the forward torque delivered from the main carriers through the gears 55, 56 and 26. The superior transmitting effect of the supplemental carriers overcomes that of the main carriers and the driven shaft is thus turned reversely.

A convenient means for controlling the two brake straps and thereby shifting at will from forward to reverse drive or vice versa may be as follows. While there might be two separate levers or pedals it is preferred to provide a single lever adapted to operate both brake straps, and preferably in a manner to apply one or the other, or to relieve both of them, but without possibility of applying both at the same time. Such a mechanism will now be described.

Figures 4, 5:
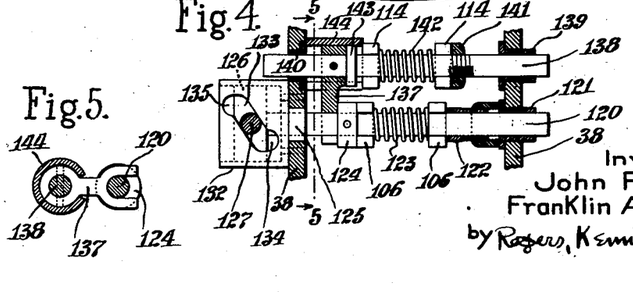
Fig. 4 is a plan view partly in section on the line 4—4 of Fig. 3.
Fig. 5 is a detail taken in section on the line 5—5 of Fig. 4.

The forked upstanding lugs 106 of the forward drive brake strap 105 are shown engaged by a rod 120, which may be referred to as the main brake rod. This rod is arranged to slide in a bearing 121 in one side of the fixed casing wall 38. Within the wall is arranged a stop sleeve 122, screw threaded for adjustment. One of the lugs 106 constantly engages against the stop sleeve, while a spring 123 constantly presses apart the two lugs, tending to relieve the brake. The rod 120 also carries a collar 124 by which the free lug 106 may be thrust toward the other lug against the spring pressure, for applying the brake. The other end of the brake rod passes slidingly through a bearing 125 in the other wall 38. Outside this wall the rod 120 carries a cylindrical head 126 and passing through this head is a bolt or cam pin 127. The pin 127 is formed with a head 128 at its lower end and its upper end has secured to it a sleeve 129 which is also engaged by an upstanding lever 130 by which the mechanism may be controlled, the lever being thrown forwardly or rearwardly to cause rotation of the rod 120. This rotation is utilized through a cylindrical cam 132, fixed to the wall 38, to cause longitudinal sliding movement of the rod. The rod head 126 fits within the cam as a piston within a cylinder, and it can rotate and slide therein. When rotated by the control lever 130 the pin 127 moves along an inclined cam groove 133. Preferably there are two of these grooves, one at the upper and the other at the lower side of the cam cylinder. When the control rod 130 is thrown rearwardly, that is toward the lower part of the sheet in Fig. 4, this obviously compels the main brake rod to slide to the right, thus compressing the spring 123 and applying the brake band 105 for forward drive. The terminus 134 of the cam slot is in the form of a notch or dwell, so that when the pin is engaged therein it will rest securely until dislodged. When the cam pin is restored to its neutral position, as seen in Fig. 4, the brake band, in fact both brake bands, are loose. The cam slot is shown as extending slantingly in the opposite direction, with a second notched terminus 135, with which the pin 127 will be engaged during reverse drive, as will next be described.

To set the mechanism for reverse drive, namely by forcing the two lugs 114 toward each other the same control handle 130 may be utilized as follows. A forked lug 137 is shown as straddling the main brake rod 120 to the left of the collar 124, and said lug is pinned to a reverse brake rod 138 which engages in the two forked lugs 114 of the brake strap 113. The reverse brake rod engages bearings 139 and 140 in the walls 38. Also it carries an adjustable collar 141 engaging outside one of the lugs, and a coil spring 142 between the lugs. The rod 138 is formed with a collar 143 against which the lug 137 contacts, and this collar moves slidingly within a stop sleeve 144, forming a permanent stop for the left hand forked lug 114. When the control lever 130 is thrown rearwardly to apply the forward drive this does not affect the reverse brake rod mechanism, but when the control lever is thrown in the opposite direction, until the cam pin 127 engages in the cam notch 135, this causes the collar 124, on the rod 120, to thrust leftward the forked lug 137 on the rod 138. This leftward movement, operating through the adjustable collar 141 throws one of the brake band lugs 114 toward the other, against the compression of the spring 142. The control lever therefore has a neutral position and two extreme positions, one of which effectively sets the mechanism for forward drive, while the other sets it for reverse drive.

It will thus be seen that power transmission apparatus and method have been described, embodying the principles and attaining the objects of the present invention; and since many matters of operation, arrangement, combination, structure and design may be variously modified without departing from the novel principles, it is not intended to limit the invention to such matters except so far as specified in the appended claims.

What is claimed is:

1. In power transmission apparatus the driving and driven members or shafts, a main transmitting means comprising a centrifugal device between the driving and driven members wherein is an inwardly and outwardly movable mass mounted on and carried around by the driving member, and connections between the driven member and mass whereby the mass is actuated to move inwardly and outwardly by reason of the speed difference between the members and operates by reacting through its centrifugal force to transmit power to the driven member at reduced ratio with increase of load and vice versa, and a supplemental transmitting means coming into action only at reduced ratio with increased load to supplement the torque delivered by the main transmitting means, comprising a second such centrifugal device between the driving and driven members actuated at low ratios by reason of the speed difference between the members and reacting through centrifugal force to transmit supplemental torque to the driven member, and a one-way device associated with the supplemental transmitting means arranged to cause it to deliver torque at the reduced ratios but leaving it inoperative at high ratios.

2. In power transmission apparatus, the driving and driven member, a first transmitting means comprising a carrier revolved bodily around an orbit by the power of the driving member, and having connections from the driven member causing its actuation at a rate corresponding with the existing speed difference of the members, and a mass cooperating with said carrier and adapted to apply its centrifugal force as a thrusting pressure resisting the actuation of the carrier and thereby transmitted as torque to the driven member; and a second transmitting means not effectively operative at high ratio but coming automatically into transmitting operation as the ratio is reduced below a predetermined point.

3. In power transmission apparatus, the driving and driven members, a first transmitting means comprising a carrier revolved bodily around an orbit by the power of the driving member, and having connections from the driven member causing its actuation at a rate corresponding with the existing speed difference of the members, and a mass cooperating with said carrier and adapted to apply its centrifugal force as a thrusting pressure resisting the actuation of the carrier and thereby transmitted as torque to the driven member; and a supplemental transmitting means comprising a carrier revolved bodily around an orbit and having connections operative from the driven member when the speed ratio is low for causing the supplemental carrier's actuation, and a centrifugal mass cooperating with said supplemental carrier.

4. In power transmission apparatus, the driving and driven members or shafts, a main transmitting means self adjustable to deliver increased torque at reduced ratio upon increase of load, and a supplemental transmitting means coming into action only at reduced ratio to enhance the delivered torque, one or both of said transmitting means comprising a centrifugal mass and cooperating carrier, the carrier adapted to engage, hold, convey inward and release the mass and being moved bodily around by the driving member and actuated by connection from the driven member.

5. In power transmission apparatus, the driving and driven members or shafts, a main transmitting means self adjustable to deliver increased torque at reduced ratio upon increase of load, and a supplemental transmitting means coming into action only at reduced ratio to enhance the delivered torque, each of said transmitting means comprising a carrier, moved around an orbit by the driving member and actuated by connection from the driven member, the same having a guide for guiding a loose mass around a circuit, a loose mass, and means for forcing the mass inwardly in such circuit.

6. In power transmission apparatus, the driving and driven members or shafts, a a main transmitting means self adjustable to deliver increased torque at reduced ratio upon increase of load, and a supplemental transmitting means coming into action only at reduced ratio to enhance the delivered torque, each of said transmitting means comprises a carrier, moved around an orbit by the driving member and actuated by connection from the driven member and having a plurality of channels or guides, cooperating with separate mass portions, and separate abutments or pushers adapted to compel the masses to move inwardly in succession.

7. In power transmission apparatus, the driving and driven members or shafts, a main transmitting means self adjustable to deliver increased torque at reduced ratio upon increase of load; and a supplemental transmitting means coming into action only at reduced ratio to enhance the delivered torque, comprising a carrier revolved bodily around an orbit by the driving member and actuated or rotated by connections from the driven member, and a centrifugal mass adapted to be thrust by said carrier in opposition to its centrifugal force.

8. Apparatus as in claim 7 and wherein the connections between the driven member and carrier comprise a one-way device or pawl and ratchet rendering such connections inoperative under conditions of high ratio.

9. Apparatus as in claim 7 and wherein the connections between the driven member and carrier comprise a gear on the carrier, a central gear on the driven shaft, a reduction gear system between said gears and a one-way device associated therewith.

10. In power transmission apparatus, the driving and driven members or shafts, a main transmitting means self adjustable to deliver increased torque at reduced ratio upon increase of load; and a supplemental transmitting means coming into action only at reduced ratio to enhance the delivered torque, comprising a planetating carrier revolved by the driving member and rotated by connections from the driven member and having a plurality of guides and abutments, and for each thereof a mass adapted to be engaged, thrust inwardly and released, whereby the centrifugal force thereof is delivered as continuous one-way torque to the driven member.

11. Apparatus as in claim 10 and wherein the connections from the driven member by which the carrier is rotated comprise a one-way device whereby such rotation is effected only at low and not at high ratios.

12. Apparatus as in claim 10 and wherein the connections from the driven member by which the carrier is rotated comprise power multiplying gearing and a one-way device whereby such rotation is effected only at low and not at high ratios.

13. Apparatus as in claim 10 and wherein the carrier rotating connections comprise a planet gear on the carrier, a loose central gear driving said planet gear, a gear support turning with the central gear, a pair of planetary gears of different diameters mounted eccentrically on the support, a central gear fast on the driven shaft engaging one of said planetary gears, a central gear engaging the other planetary gear, and means including a one-way device for holding said last mentioned central gear against rotation in one direction.

14. Apparatus as in claim 10 and wherein the carrier rotating connections comprise a planet gear on the carrier, a loose central gear driving said planet gear, a gear support turning with the central gear, a pair of planetary gears of different diameters mounted eccentrically on the support, a central gear fast on the driven shaft engaging one of said planetary gears, a central gear engaging the other planetary gear, and means including a one-way device for holding said last mentioned central gear against rotation in one direction, said last mentioned central gear being of smaller diameter than the gear fast on the driven shaft.

15. A planetary carrier for power transmitting apparatus comprising a hollow structure containing a plurality of annular channels or guides one concentrically within another, an abutment or pusher in each channel, and a centrifugal mass in each channel.

16. A carrier as in claim 15 and wherein the abutments are so spaced around the periphery as to maintain successive thrusting actions on the respective masses, and continuous transmission.

17. In power transmission apparatus, the driving and driven members or shafts, a main transmitting means self adjustable to deliver increased torque at reduced ratio upon increase of load, and a supplemental transmitting means coming into action only at reduced ratio to enhance the delivered torque; said supplemental means adapted to thrust the driven member in the same direction but with greater torque than the main means, and a reversing means for causing a reversal of the direction of thrust of the supplemental means upon the driven member.

18. Apparatus as in claim 17 and wherein the reversing means also multiplies the power of the supplemental means.

19. In power transmission apparatus, the driving and driven members or shafts, a main transmitting means self adjustable in ratio and torque; and a supplemental transmitting means comprising a planetating carrier revolved bodily around an orbit by the driving shaft and rotated by connections from the driven shaft, and a centrifugal mass adapted to be thrust inwardly by said carrier; said connections for rotating the carrier comprising a gear train adapted to apply the centrifugal force in said mass to forward drive of the driven shaft, a second gear train adapted to apply the same to reverse drive of the driven shaft, and control means to render one or the other of said trains effective at will.

20. Apparatus as in claim 19 and wherein the control means comprises brake bands applied to pulleys for anchoring gears in said respective gear trains.

21. In power transmission apparatus, the driving and driven members or shafts, a main transmitting means self adjustable in ratio and torque; and a supplemental transmitting means comprising a planetating carrier revolved bodily around an orbit by the driving shaft and rotated by connections from the driven shaft, and a centrifugal mass adapted to be thrust inwardly by said carrier; the connections for rotating said carrier comprising a gear on the carrier, a first central gear loose on the driven shaft for actuating said gear and carrier, a gear support turning with said central gear, a stud on said support parallel to the driven shaft, three planet gears on said stud connected to rotate together and of different sizes, a second central gear fast on the driven shaft meshing with the intermediate-size planet gear, a third central gear loose on the driven shaft and meshing with the largest planet gear, a first friction wheel, a one-way device between the third central gear and the first friction wheel, permitting the gear to turn in the same direction as the driving shaft but preventing it turning reversely, a first brake means for holding said first friction wheel stationary, whereby to cause the centrifugal force of said mass to be transmitted as forward drive to the driven shaft, a fourth central gear loose on the driven shaft and meshing with the smallest planet gear, a second friction wheel connected to the fourth central gear, a second brake means for holding the second friction wheel stationary, when the first friction wheel is not held stationary, whereby to cause the centrifugal force of the mass to be transmitted as reverse drive to the driven shaft, and control means for applying or releasing said first and second brake means.

In testimony whereof, we have affixed our signatures hereto.

JOHN REECE.
FRANKLIN A. REECE.